Aug. 22, 1933.  C. M. STANLEY  1,923,124
FLEXIBLE CONNECTION
Filed April 4, 1932

INVENTOR
Carroll M. Stanley
BY
ATTORNEY

Patented Aug. 22, 1933

1,923,124

UNITED STATES PATENT OFFICE 1,923,124

FLEXIBLE CONNECTION

Carroll M. Stanley, Piedmont, Calif., assignor to Oliver United Filters Inc., San Francisco, Calif., a Corporation of Delaware Application April 4, 1932. Serial No. 603,162

4 Claims. (Cl. 285—90)

This invention relates to a flexible vacuum connection and is particularly adapted for connecting the filter valve of a continuous filter to a vacuum line.

As is well known, the entire cycle of a continuous filter (cake formation, washing, drying and discharging) is controlled by an automatic valve. This valve is composed of two main parts, the valve seat and the valve chamber. The valve seat is fixedly attached to the drum trunnion or filter shaft and revolves with it, while the valve chamber is generally mounted on a journal extension from the valve seat and is held in a fixed position. The contacting faces of the valve are an accurately machined and generally ground fit; and in order to avoid leakage, should at all times be maintained in accurate registration. In order to relieve the valve of any undue strain, tending to separate its engaging faces, it is necessary to provide all connections to the valve with a certain amount of flexibility.

Strains tending to separate the engaging faces of the valve may be due to mechanical strains thrown upon the valve in various ways, generally by piping to which the valve is connected, or to the tendency of the vacuum existing in the valve and piping to separate the valve chamber from the valve seat. Various expedients have been tried for the purpose of correcting these tendencies, but all of them have been subject to some objection or other. For example, flexible hose connections have been tried but have been found objectionable inasmuch as the atmospheric pressure external to the hose tends to collapse it when a partial vacuum is maintained within it. The collapse of the hose blocks the passageway through it and as a result, some means must be resorted to to prevent its collapse. Furthermore, collapsing of the hose tends to shorten it and consequently to pull the valve or chamber from the valve seat or cause an excessive strain on the journal upon which the valve chamber is mounted. Armoured hose has been tried, and although it is not subject to collapse, it has either not proven to be sufficiently flexible to meet the requirements or sufficiently fixed in length to prevent strains developing when the vacuum is applied.

In general therefore it is the object of my invention to provide a vacuum connection which will not be collapsed or shortened due to the differential pressure existing between its interior and exterior and which at the same time is possessed of a sufficient flexibility to compensate for any relative motion that may take place between the vacuum line and the valve chamber and for inaccuracies in the installation of these two members.

More specifically the object of my invention is the provision of a flexible vacuum connection comprising a pair of registering pipe fittings connected by means of a flexible diaphragm and provided with adjustable means whereby the pipe fittings may be maintained in any predetermined spaced relation.

The invention possesses other advantageous features, some of which with the foregoing, will be set forth at length in the following description where I shall outline in full that form of my invention which I have selected for illustration in the drawing accompanying and forming part of the present specification. In said drawing, I have shown one form of my invention, but it is to be understood that I do not limit myself to such form, since the invention as set forth in the claims, may be embodied in a plurality of forms.

Referring to the drawing.

Figure 1:
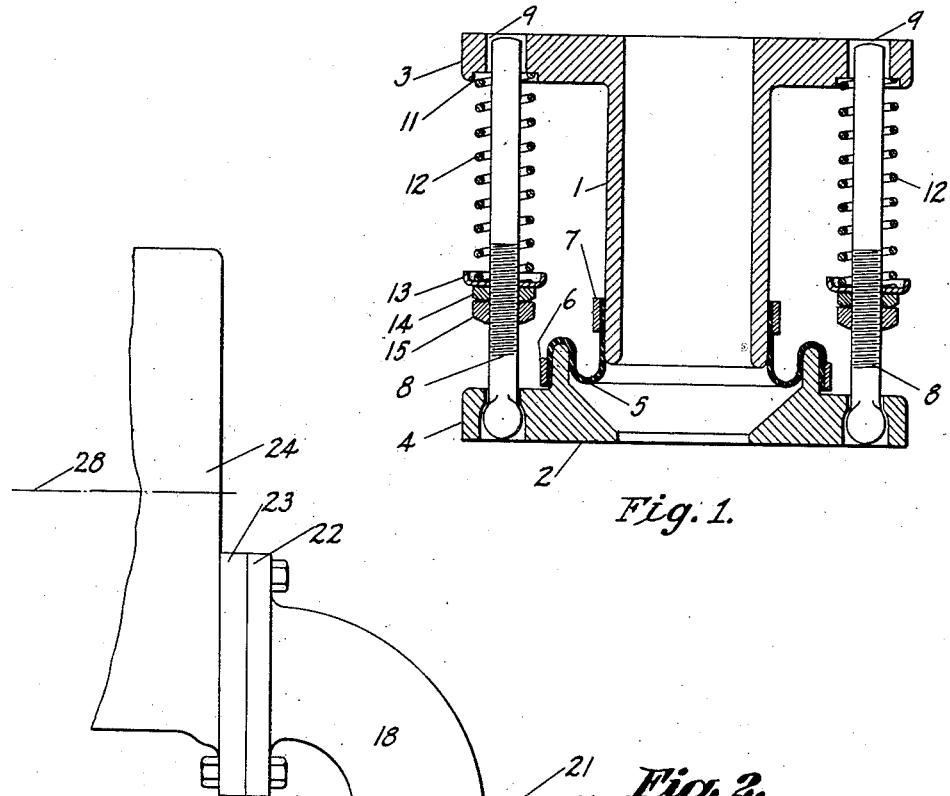
Fig. 1 is a vertical section of a vacuum connection embodying the objects of my invention.
Figure 2:
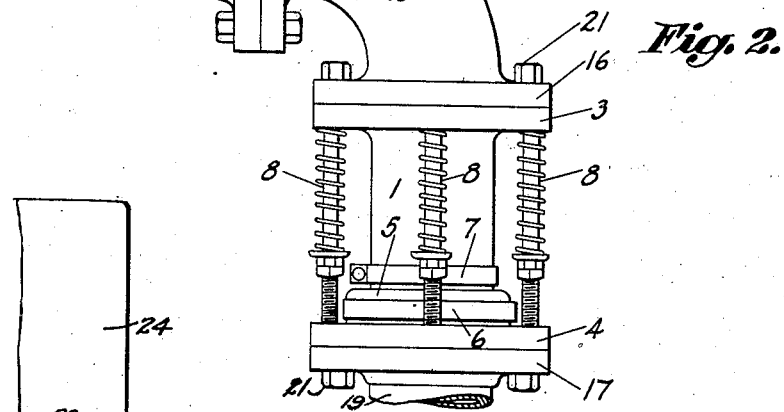
Fig. 2 is a side elevation of the connection as shown in Fig. 1 indicating one way in which the vacuum connection is inserted in the vacuum line of a continuous filter.

As clearly shown in Figs. 1 and 2, the connection consists of a pair of registering male and female pipe fittings 1 and 2 respectively, each of which is provided with flanges 3 and 4. A flexible diaphragm 5 of rubber or fabric is secured to the registering ends of the pipe fittings 1 and 2 by means of hose clamps 6 and 7.

The pipe fittings 1 and 2 are maintained in any predetermined spaced relation by means of a plurality of studs 8 movably secured to the fitting 2 by some such means as ball and socket joints and having their opposite ends pass loosely through openings 9 in the flange 3 of the fitting 1. The underface of the flange 3 is provided with recesses 11 concentric with the openings 9 in which are seated the upper ends of coil springs 12 which surround the studs 8. The lower ends of these springs rest in spring seat 13 which are adjustably supported by means of nuts and lock nuts 14 and 15 threaded on the studs 8. It is to be noted that when connected as above described the fittings 1 and 2 are free to be moved relative to each other either in a horizontal or in a longitudinal direction.

As shown in Fig. 2, the flexible connection may be inserted in the vacuum line of the filter by means of complementary flanges 16 and 17 on the elbow 18 and the fitting 19 respectively and secured thereto in any well known manner as by means of bolts 21. The elbow 18 is secured by means of the flange 22 to the flange 23 of the valve chamber 24. Before inserting the flexible vacuum connection in the vacuum line, the flange 16 is lined up with the flange 17 as accurately as possible and these members are so spaced as to just accommodate the vacuum connection.

When inserted as above described, the vacuum connection has sufficient flexibility not only to compensate for any inaccuracies in the alignment of the elbow 18 and the fitting 19, but will also serve to maintain the valve chamber 24 and its valve seat (not shown) in perfect engagement regardless of any relative motion that may take place between the fitting 19 and the valve chamber 24 due to vibration or other cause. Furthermore the compression of the coil springs 12 can be readily adjusted by means of the nuts 14 to compensate for the action of the atmospheric pressure exerted externally tending to telescope the two fittings 1 and 2. Compensating means such as this is required due to the fact that there is a differential pressure between the exterior and interior of the connection and consequently the exterior atmospheric pressure which is greater than the interior pressure, tends to telescope the two fittings. As above explained, it is essential that the two fittings be maintained at a predetermined spaced relation in order to permit the perfect engagement of the valve chamber and the valve seat. This differential pressure tending to telescope the two fittings 1 and 2 varies with the degree of vacuum maintained in the interior of the connection and therefore means must be provided for balancing the pressure of the springs 12 against the telescoping action of the differential pressure. The adjustable nuts 14 provide a very convenient means by which this may be done.

Figure 3:
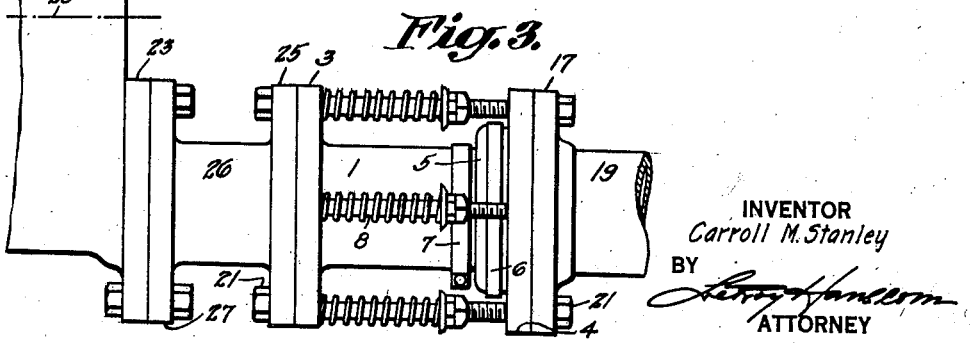
Fig. 3 is a side elevation of the connections as shown in Fig. 1 indicating another manner in which the connection may be inserted in the vacuum line.

In Fig. 3 the vacuum connection has been inserted in the vacuum line parallel to the axis of the valve journal and the valve chamber 24. The flange 3 registers with a flange 25 of a fitting 26 and is connected thereto by means of bolts 21 in the same manner that the flange 4 is secured to the fitting 19. The flange 27 of the fitting 26 is in turn bolted to the flange 23 of the valve chamber 24.

The strains put upon the valve chamber tending to unseat it from the valve seat differ somewhat with the manner in which the connection is inserted in the vacuum line. If the flexible connection is inserted at right angles to the valve journal as shown in Fig. 2 the tendency will be for the differential pressure existing between the interior and exterior of the connection to cause an excessive load on the journal at right angles to the valve face. If the vacuum connection is inserted in line with the axis of the journal the differential pressure will have a tendency to shorten the connection and to therefore unseat the valve chamber from the valve seat. In either case the vacuum connection above described prevents strains being put upon the valve faces which may tend to unseat them, for it is capable of absorbing considerable lateral play and at the same time can be maintained at any predetermined length in balanced relation with any differential pressure that may exist between its interior and exterior. Although the connection has been described with particular reference to vacuum connections for continuous filters, it is to be understood that the use of this connection is by no means limited to this specific purpose and may be employed to accomplish the objects recited, in connection with any type of equipment.

I claim:

1. A vacuum connection comprising a pair of registering pipe fittings each flanged at its outer end; a flexible diaphragm for connecting the adjacent ends of said fittings; studs movably secured to one of said flanges and having their free ends loosely engaged in openings formed in the other of said flanges and springs disposed between said flanges for preventing said fittings from telescoping.

2. A vacuum connection comprising a pair of registering male and female pipe fittings each flanged at its outer end; a flexible diaphragm for connecting the adjacent ends of said fittings; studs movably secured to one of said flanges and having their free ends loosely engaged in openings formed in the other of said flanges and springs disposed between said flanges for preventing said fittings from telescoping.

3. A vacuum connection comprising a pair of registering male and female fittings each flanged at its outer end; a flexible diaphragm for connecting the adjacent ends of said fittings; studs movably secured to one of said flanges and having their free ends loosely engaged in openings formed in the other of said flanges; longitudinally adjustable spring seats carried on said studs and springs disposed in said seats and having their free ends in engagement with said last mentioned flange.

4. A vacuum connection adapted to be inserted in the vacuum line of a continuous vacuum filter in close proximity to the filter valve, comprising a pair of registering male and female fittings each flanged at its outer end; a flexible diaphragm for connecting the adjacent ends of said fittings; studs movably secured to one of said flanges and having their free ends loosely engaged in openings formed in the other of said flanges; longitudinally adjustable spring seats carried on said studs and springs disposed in said seats and having their free ends in engagement with said last mentioned flange.

CARROLL M. STANLEY.